United States Patent [19]

Gale et al.

[11] Patent Number: 4,693,798
[45] Date of Patent: Sep. 15, 1987

[54] METHOD OF TREATING CONTAMINANT IONS IN AN AQUEOUS MEDIUM WITH ELECTROLYTICALLY GENERATED FERROUS IONS, AND APPARATUS THEREFOR

[75] Inventors: Stephen B. Gale, Williamsville; Philip P. O'Donnell, Cheektowaga, both of N.Y.

[73] Assignee: Niagara Environmental Associates, Inc., Cheektowaga, N.Y.

[21] Appl. No.: 415,387

[22] Filed: Sep. 7, 1982

[51] Int. Cl.$^4$ .............................................. C02F 1/46
[52] U.S. Cl. .................................. 204/149; 204/151; 204/152
[58] Field of Search ............... 204/149, 130, 151, 152, 204/97, DIG. 13; 423/55

[56] References Cited

U.S. PATENT DOCUMENTS

| 1,570,212 | 1/1926 | Duhme | 204/292 |
| 3,925,203 | 12/1975 | Turner | 204/149 |
| 3,926,754 | 12/1975 | Lee | 204/149 |
| 4,123,339 | 10/1978 | Gale et al. | 204/149 |
| 4,163,716 | 8/1979 | Turnbull | 204/149 |
| 4,188,272 | 2/1980 | Moring | 204/149 |
| 4,295,946 | 10/1981 | Nazarian et al. | 204/149 |
| 4,321,125 | 3/1982 | Nazarian et al. | 204/149 |

OTHER PUBLICATIONS

Hoover, C. R., Masselli, J. W., "Disposal of Waste Liquors from Chromium Plating", *Ind. & Engr. Chem.*, vol. 33, Jan. '41, pp. 131-134.

*Primary Examiner*—John F. Niebling
*Attorney, Agent, or Firm*—Sommer & Sommer

[57] ABSTRACT

An aqueous medium containing contaminant ions such as hexavalent chromium ions is treated by introducing electrolytically generated ferrous ions which are preferably generated in water acidified to a low enough pH to prevent the formation of flocculent material. The ferrous ions reduce the hexavalent chromium ions to a trivalent state, and thereafter alkaline material is introduced into the medium to raise its pH high enough to cause insoluble chromic hydroxide and ferric hydroxide to precipitate. The apparatus includes a ferrous ion generator for recirculating liquid through an electrolytic cell and a receptacle, from which receptacle liquid for end use can be withdrawn and to which makeup water and acid can be added.

11 Claims, 1 Drawing Figure

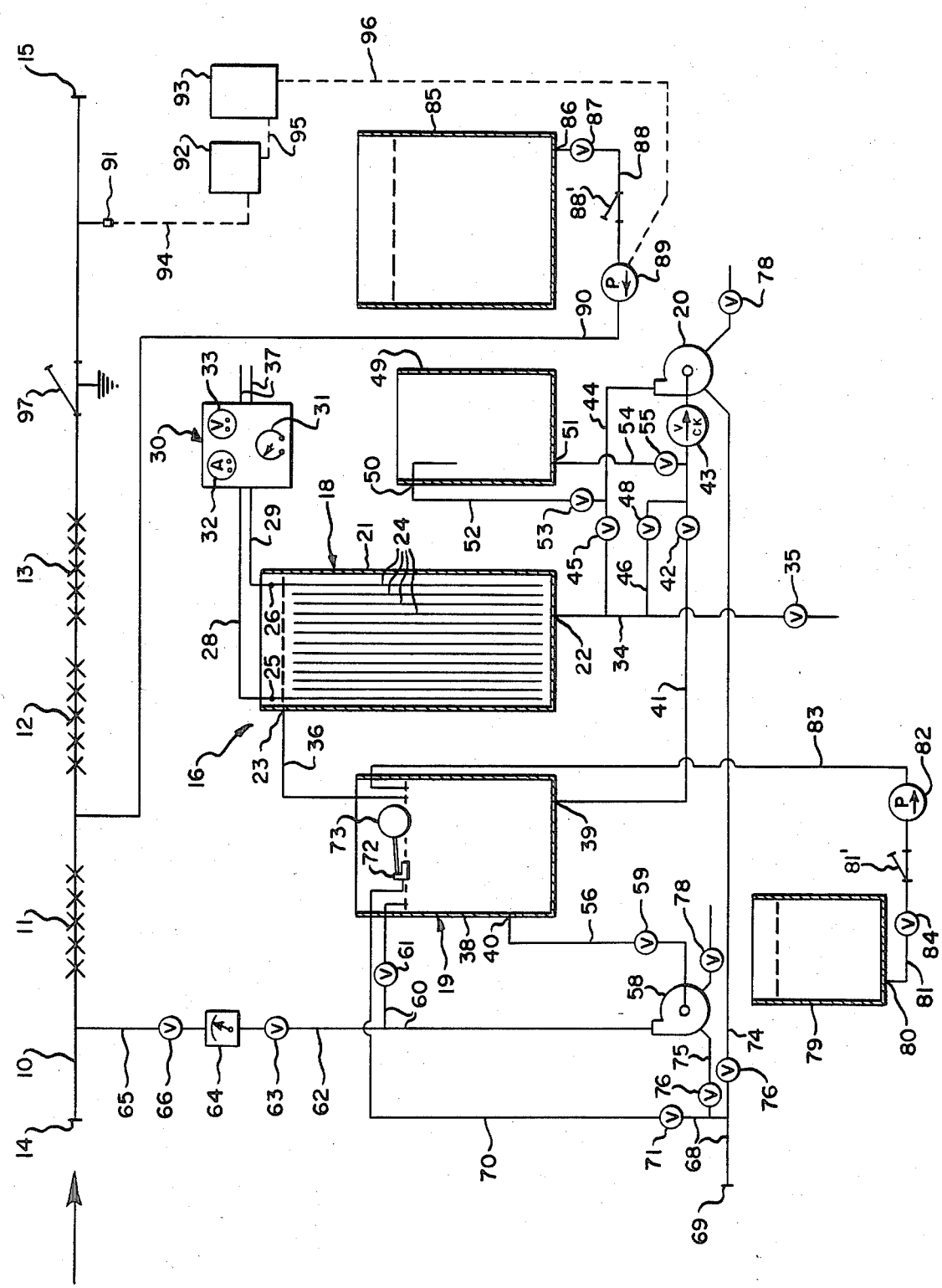

METHOD OF TREATING CONTAMINANT IONS IN AN AQUEOUS MEDIUM WITH ELECTROLYTICALLY GENERATED FERROUS IONS, AND APPARATUS THEREFOR

This invention relates to the control of metallic contaminant ions in waste water from industrial operations.

PRIOR ART

Some industrial waste waters contain levels of metallic contaminant ions, such as hexavalent chromium ions ($Cr^{6+}$), which are harmful to health, and therefore governmental regulations require the lowering of their levels to prescribed limits before the waste water can be dumped. Using hexavalent chromium ion as an example of a commonly encountered toxic metallic contaminant ion, various techniques are known for removing such ions.

One technique is a chemical reaction process in which hexavalent chromium ions are reacted with a barium salt or lead salt to form an insoluble precipitate. Since barium ions and lead ions themselves have toxicity, the control of the amount of additive is difficult.

Another technique is a chemical reduction process in which the aqueous medium containing the hexavalent chromium ions is acidified to a relatively low pH accompanied by the addition of reducing agents such as ferrous salt, sulfur dioxide, sulfites disulfites and sulfides to reduce the hexavalent chromium ions ($Cr^{6+}$) to a trivalent state ($Cr^{3+}$), followed by the addition of an alkaline material which in water provides hydroxyl radials such as caustic soda or lime to precipitate hydroxides including trivalent chromic hydroxide $[Cr(OH)_3]$. This technique requires substantial quantities of acid and alkaline material since the pH of the entire volume of aqueous medium requires adjustment.

Still another technique uses an ion exchange resin which selectively removes hexavalent chromium ions, later regenerated from the resin. The equipment required for carrying out this ion exchange process involves high capital cost and difficult operational control.

Yet another known technique involves the electrochemical reduction of waste water containing metallic contaminant ions. The waste water is passed through a cell containing iron electrodes to which a dc current is applied causing dissolution of the iron anode to form ferrous ions ($Fe^{2+}$) which reduce the contaminant ion, e.g. hexavalent chromium ion ($Cr^{6+}$) to a trivalent state ($Cr^{3+}$). Three ferrous ions ($Fe^{2+}$) severally give up one electron to become ferric ions ($Fe^{3+}$) and these three electrons are acquired by one hexavalent chromium ion ($Cr^{6+}$) to reduce it to a trivalent chromium ion ($Cr^{3+}$). If the waste water has not been acidified to pH 2.8 or below, hydroxide precipitates including chromic hydroxide $[Cr(OH)_3]$ and ferric hydroxide $[Fe(OH)_3]$ accumulate in the cell, which eventually require the cell to be shut down for cleaning by an acid wash. Such an electrochemical reduction process is disclosed in U.S. Pat. No. 3,962,754 and the periodic acid wash cleaning is disclosed in U.S. Pat. No. 4,123,339.

If the pH of the medium in the electrochemical cell is maintained at pH 2.8 or below, the insoluble precipitates will not be formed until alkaline material which in water provides hydroxyl radials is added to the medium, usually after it has left the cell, to raise its pH to cause the insoluble hydroxides to precipitate enabling removal. The low pH operation of an electrochemical cell having iron electrodes to reduce hexavalent chromium ions is disclosed in several publications, including an article appearing on pages 554–560 of Volume 10 of the 1961 Reports of the Government Industrial Research Institute, Nagoya, Japan, (reported in Chemical Abstracts, Vol. 56 (1962), col. 7066–7067), in which cross-reference is made to an article appearing on pages 32–34 of the Japan Industrial Water Association Journal No. 21 for June 1960; an article appearing on pages 389–391, 393–394 and 396 of a September 1970 issue, and pages 456–461 of an October 1970 issue, of a German publication entitled "Metall Reinigung, Vorbehandlung Oberflachentechnik, Formung", by Vladimir Ruml, (reported in Chemical Abstracts, Vol. 74 (1971), pg. 230), who was also the patentee of Czechoslovakian Pat. No. 147,117 issued Jan. 15 1973; and an article by G. A. Selitskii appearing on pages 56–59 of a Russian publication entitled "Bodosnabzh. Kanaliz. Predpr. Mashinostr.", (reported in Chemical Abstracts, Vol. 74 (1971), pg. 290).

SUMMARY OF THE PRESENT INVENTION

The present invention involves the electrolytic generation of ferrous ions in a separate aqueous medium and the subsequent use of them, preferably to chemically reduce a metallic ion such as hexavalent chromium ion.

With the aforementioned prior art technique of electrochemically reducing hexavalent chromium ions in an aqueous medium, the contaminated stream flows through the cell at a fairly neutral pH, at which insoluble hydroxides form. This technique has the disadvantages of imposing hydraulic limitations due to the dimensional size of the electrochemical cell, the insitu generation of ferrous ions followed by ferric and chromic hydroxide production which tend to foul the electrode surfaces, and severely limited chromate removal capacity due to the power supply design in relation to the water quality of the stream being treated. If the pH of the influent stream to the cell is lowered, and raised in the effluent from the cell, large amounts of acid and alkaline material must be used to adjust the pH of the entire stream.

These disadvantages are avoided in the practice of the present invention which contemplates the generation of high levels of ferrous ions in a recirculating liquid body, preferably of fresh water with the pH controlled to not more than 2.8. A portion of this recirculating liquid body is continuously bled off and introduced into the contaminated stream which usually has a fairly neutral or slightly acid pH and contains the metallic ions such as hexavalent chromium ions, at about a 1:100 volumetric ratio of bleed stream to contaminated stream. The ferrous ions react chemically with the hexavalent chromium ions and reduce them to a trivalent state. Since the pH of the combined bleed and contaminated streams is likely still to be on the acidic side, alkaline material which in water provides hydroxyl radicals is then added to such combined streams to adjust the pH to 7.5 or above and effect precipitation of chromic and ferric hydroxides.

The advantages of the process and apparatus of the present invention include: no hydraulic limitations on the electrolytic cell since the contaminated stream to be treated does not flow through the cell; since the electrolytic cell is nothing more than a ferrous ion generator, there is very little limitation on the rate at which ferrous ions may be generated, and hence the hexavalent chromium ion level and flow rate of the contaminated stream to be treated, the principal design factors being the electrode life of the consumable iron electrodes and the size of the power supply; no fouling or scaling of the electrodes occurs since they are dissolved in water at a pH less than 2.8 which prevents the formation of insoluble metallic hydroxides in the electrolytic cell, at least ferric hydroxide, thus avoiding an acid wash cycle and the attendant down time of a cell such as used in electrochemical reduction; since fresh water, such as tap or city water, preferably is fed to the ferrous ion generator, metallic contaminant ions that might otherwise be present if another aqueous medium were used and which tend to increase fouling and reduce efficiency in the electrochemical reduction system, such as hexavalent chromium ions, are absent; water consumption, as well as the consumption of acid and alkaline material, is greatly reduced where the bleed in stream is introduced into the contaminated stream as low as about one percent by volume; flow control loops or pneumatically operated valves used in some prior art apparatus employing multiple electrochemical reduction cells, are eliminated since the contaminated stream does not flow through the electrolytic cell of the present invention; and, finally, compared to existing systems operator labor and maintenance is substantially reduced.

These and other advantages will be apparent from the illustration and description of the following preferred embodiment of the present invention.

DESCRIPTION OF PREFERRED EMBODIMENT

The accompanying drawing illustrates a schematic embodiment of the present invention, which is shown as including a main pipe 10 in which three commercially available motionless mixers 11, 12 and 13 are arranged in tandem. The left flanged end 14 of this pipe is open and serves as the inlet for the influent, which, for example, may be an aqueous medium containing reducible metallic contaminant ions such as hexavalent chromium ions, derived from any suitable source such as cooling tower blowdown, or chromium plating bath or rinse water. The right flanged end 15 of pipe 10 serves as the outlet for the treated stream of effluent. Left pipe end 14 is adapted to be connected to any suitable supply of influent, and right pipe end 15 is adapted to be connected to suitable downstream separation equipment (not shown) for the effluent.

The ferrous ion generator, represented generally by the numeral 16, includes an electrolytic cell 18 and a receptacle 19 operatively associated with a recirculation pump 20, preferably of the centrifugal type which is commercially available. Cell 18 includes an electrically non-conductive cell body or tank 21 having a normal inlet 22 and outlet 23, in which a plurality of electrodes 24, preferably iron plates, are suitably arranged in mutually spaced relation. The end electrodes 25 and 26 are electrically connected via conductors 28 and 29, respectively, to a suitable constant current dc power supply control unit 30 including an adjustable current controller 31, and associated ammeter 32 and voltmeter 33. Unit 30 is serviced by conductors 37 leading from a remote suitable ac power source (not shown) and converts an ac input to the desired dc output applied to the end electrodes 25 and 26. These electrical components are suitable commercially available equipment.

As shown, electrodes 24 are in a bipolar arrangement in which the corresponding one side of each such electrode is positive, while the opposite side is negative. Thus if left end electrode 25 is positive and right end electrode 26 is negative, the left side of each intermediate electrode 24 is negative and the right side of each such intermediate electrode is positive. In a bipolar arrangement as shown, whatever current flows through the cell flows across each pair of opposing positive and negative electrode surfaces. If desired, a monopolar arrangement can be used wherein half of the electrodes are positive on both sides and these positive electrodes are interdigitally interposed in spaced relation to an equal number of all negative electrodes.

Cell inlet 22, in the bottom wall of cell body 21, is connected to a conduit 34 having a drain valve 35 therein. Cell outlet 23, in the side wall of cell body 21 near its upper end, is connected to one end of a conduit 36 which at its other end communicates with the interior of receptacle 19. This receptacle is shown as being a tank 38 having a first outlet 39 in its bottom wall and a second outlet 40 in its side wall near the bottom. Bottom outlet 39 is connected via conduit 41 to the inlet of pump 20 and this conduit has two spaced valves 42 and 43 therein. Valve 43 is a check valve allowing flow toward pump 20. The outlet of pump 20 communicates with conduit 34 via a conduit 44 having a valve 45 therein. Another conduit 46 establishes communication between conduit 34 and conduit 41 between valves 42 and 43. A valve 48 is in conduit 46. Receptacle 19 or tank 38 serves as a ferrous ion generating tank.

A ferrous ion storage tank 49 is shown provided for a purpose explained later herein. This tank has an inlet 50 in its side wall near the upper end thereof, and an outlet 51 in its bottom wall. Inlet 50 is connected via conduit 52 to conduit 44 between valve 45 and the outlet of pump 20. A valve 53 is in conduit 52. Tank outlet 51 is connected via conduit 54 with conduit 41 between check valve 43 and the point of connection of conduit 46 with conduit 41. A valve 55 is in conduit 54.

Receptacle outlet 40 is shown as connected to one end of a conduit 56 the other end of which communicates with the inlet of a ferrous ion injection pump 58, preferably of the centrifugal type which is commercially available. A valve 59 is arranged in conduit 56.

A conduit 60 is shown as establishing communication between the outlet of pump 58 and the interior of receptacle 19, entering through the side wall thereof adjacent its upper end. A valve 61 is arranged in conduit 60. A branch conduit 62 having a valve 63 therein connects conduit 60 to the inlet of a suitable commercially available flow indicator 64, the outlet of which is communicatively connected via conduit 65 to pipe 10 upstream of mixer 11. A valve 66 is shown arranged in conduit 65.

Fresh water can be supplied to receptacle 19 from a pipe 68 having a flanged inlet end 69 which may be connected to a city water or other suitable fresh water supply (not shown). A conduit 70 having a valve 71 therein communicates at one end with pipe 68 and at its other end with the inlet of a float valve 72 having a float 73 arranged within receptacle 19 near the upper end thereof. Float 73 is supported by the level of liquid within this receptacle and regulates operation of valve 72 to maintain the liquid in the receptacle at a substantially constant level, admitting fresh water when the level drops. Fresh water conduit 70 is shown as penetrating the side wall of receptacle 19 near its upper end.

Pumps 20 and 58 are preferably of the type having fluid jacketed seals and so are shown as connected with pipe 68. Thus, the seals of pumps 20 and 58 are serviced by fresh water conduits 74 and 75, respectively, each having valves 76 upstream of the pumps and valves 78 downstream of these pumps.

Means are provided to supply acid to receptacle 19 to keep the pH at 2.8 or lower of the liquid in receptacle 19. As shown, such means comprise a non-corrosive tank 79 having an outlet 80 in its bottom wall, a pump inlet conduit 81, a pump 82, and a pump outlet conduit 83. Pump 82 is preferably a chemical metering pump of the positive displacement type, commercially available. Conduit 81 having a valve 84 therein establishes communication between acid tank outlet 80 and the inlet of acid pump 82. A strainer 81' is preferably provided in conduit 81 between valve 84 and the inlet of pump 82. Conduit 83 connected to the outlet of pump 82 is arranged to communicate with the interior of receptacle 19 being shown as penetrating the side wall thereof near its upper end.

Means may be provided for introducing alkaline material into main pipe 10 between mixers 11 and 12 therein. As shown, such means comprise a caustic tank 85 having an outlet 86 in its bottom wall, a pump inlet conduit 88, a pump 89, and a pump outlet conduit 90. Pump 89 is preferably a chemical metering pump of the positive displacement type, commercially available. Conduit 88 having a valve 87 therein establishes communication between caustic tank outlet 86 and the inlet of caustic pump 89. A strainer 88' is preferably provided in conduit 88 between valve 87 and the inlet of pump 89. Conduit 90 establishes communication between the outlet of pump 89 and pipe 10.

The pH of the treated stream flowing through pipe 10 may be sensed downstream of mixer 13 and utilized to control the upstream feed of alkaline material. While such means may be variously constructed, the same is shown as comprising a pH sensor 91, a pH analyzer-transmitter 92 and an adjustable speed drive controller 93 for operation of the dc motor (not shown) for caustic pump 89. The pH sensor 91 senses the pH of the liquid flowing through pipe 10, resulting from inline mixing of ferrous ions and alkaline material with the contaminated influent to the pipe inlet 14.

Sensor 91 is typically a commercially available pH glass electrode probe adapted to generate an electrical signal, transmitted via electrical line 94 as input to analyzer-transmitter 92, also a commercially available device. This device converts the input signal to a small current measured in milliamperes which is transmitted via electrical line 95 to controller 93, another commercially available device. The electrical signal output of controller 93 is transmitted via electrical line 96 to the dc pump motor (not shown) and controls its speed, thus controlling the feed rate of the alkaline material to pipe 10 from caustic tank 85.

A grounded iron body strainer 97 is preferably arranged in pipe 10, downstream of strainer 13 and upstream of pH sensor 91, to remove any electric charge on the liquid flowing through pipe 10 and thereby prevent a false pH to be read by sensor 91 which is an electrical device.

The various conduits described above, including pipe 10, are preferably fabricated of commercially available PVC (polyvinylchloride) piping and fittings. Where connection between conduits is stated, a communicative connection is intended.

Pumps 20 and 58 preferably have chlorinated polyvinylchloride (CPVC) housings.

The various valves 35, 42, 45, 48, 53, 55, 59, 61, 63, 66, 71, 76, 78, 84 and 87 preferably are commercially available hand valves, made of suitable non-corrosive material such as PVC, capable of being manipulated to an on or off position, or adjusted to an intermediate controlled flow position as in the case of valves 61, 63, 66, and 78.

Tanks 38 and 49 are preferably made of a non-corrosive material such as reinforced fiber glass plastic, and are commercially available, selected for suitable size, and may be modified to provide inlets and outlets where desired.

Acid tank 79 is preferably made of non-reinforced polyethylene and is commercially available.

Caustic tank 85 is preferably made of steel and is commercially available.

The tank body 21 of cell 18 is suitable fabricated of reinforced fiber glass plastic, preferably having removable slotted PVC inserts (not shown) for permitting the insertion and removal of the electrode plates 24-26 and maintaining them in the desired spaced relation. These iron electrode plates are consumed in use to provide the ferrous ions and therefore require replacement periodically. The polarity of the electrodes may be reversed periodically, if desired, to even their wear on both sides.

All of the above described apparatus is preferably suitably mounted on a support such as a skid (not shown) to provide a portable unit which can be moved to the desired site and set up for operation.

To set up the portable unit for operation, it is first placed in the desired location on a suitable foundation. The leads 37 are connected to the remote ac power supply (not shown). Electrical power under control of individual switches (not shown) is suitably supplied to the electric motors (not shown) for the various pumps 20, 58 and 82. Electrical power is also suitably supplied to the pH analyzer-transmitter 92 and adjustable speed drive controller 93.

Fresh water such as city water is connected to pipe end 69. The influent and effluent connections are made to pipe ends 14 and 15, respectively.

Tank 79 is filled with an acid solution such as sulfuric or hydrochloric acid. Tank 85 is filled with alkaline material which in water provides hydroxyl radials such as a caustic soda solution.

A set of electrodes 24-26, typically suitably dimensioned, cold rolled steel plates, are installed in cell 18. Iron electrodes of any suitable configuration and construction may be employed, the steel plates described being only illustrative. The number and size of the electrodes depends upon the ferrous ion generating capacity of the cell.

NORMAL OPERATION

Under normal operating conditions, valves 35, 48, 53 and 55 are closed, valves 42, 45, 59, 61, 71, 76, 84 and 87 are open, while valves 63, 66 and 78 are adjusted to the proper flow rate. Pumps 20, 58, 82 and 89 are running. Current is applied to electrodes 25 and 26 by the properly adjusted setting of controller 31. The voltage will depend upon the conductivity of the electrolytic solution in cell 18.

During this normal operation, pump 20 is continuously recirculating a body of liquid containing ferrous ions between cell 18 and receptacle 19, while pump 58 is continuously recirculating some of this liquid body through conduits 56 and 60. A portion of the latter stream is bled off through conduit 62, reduced in flow by valves 63 and 66, and this reduced bled off flow is ultimately introduced into pipe 10 via conduit 65. Whatever volumetric depletion tends to occur in ferrous ion generating tank 38 is replaced by incoming acid and fresh water controlled by valve 72 and pump 82, respectively. While this is going on, cell 18 is continuously generating more ferrous ions to replace those in the solution discharged by conduit 65.

Acidified water containing the desired level of ferrous ions is thus introduced into the contaminated stream in main pipe 10 The ferrous ions ($Fe^{2+}$) chemically react with the hexavalent chromium ions ($Cr^{6+}$) to reduce the latter to trivalent chromium ions ($Cr^{3+}$) and become ferric ions ($Fe^{3+}$) in doing so. Mixer 11 assures the thorough inline mixing of the influent contaminated stream entering at pipe end 14 and bleed in stream entering pipe 10 at the juncture of conduit 65 therewith.

Downstream of mixer 11, alkaline material which in water provides hydroxyl radicals is introduced into pipe 10 via conduit 90, in an amount controlled by the pH sensor 91 which regulates the speed of operation of the dc motor (not shown) driving pump 89. Such alkaline material is so introduced to elevate the pH in the treated contaminated stream to at least pH 7.5 in order to form the insoluble hydroxide precipitates such as chromic hydroxide [$Cr(OH)_3$] and ferric hydroxide [$Fe(OH)_3$]. The mixers 12 and 13 assure thorough inline mixing to effect the chemical reactions. The solids may be separated from the liquid in the effluent issuing from pipe end 15, by suitable downstream separation equipment, not shown because forming no part of the present invention.

STARTUP OPERATION

The startup operation is separately described from normal operation in order to explain how the ferrous ion concentration is raised in the recirculating liquid body flowing between cell 18 and receptacle 19 to the desired operating level.

Let it be assumed initially that the apparatus has been installed as previously described, including acid and caustic solutions filling tanks 79 and 85 to appropriate levels, and the influent and effluent connections to pipe 10 have been made, as well as a connection of pipe 68 to a city water supply while valves 71 and 76 are closed. In this condition, it is assumed that receptacle 19 and cell 18 are empty of liquid, but the electrodes 24–26 are in place and the power supply thereto is off. At this time, none of the pumps 20, 58, 82 and 89 is running, and all valves are closed.

Valves 76 are opened and valves 78 are opened slightly to allow a very slight stream of fresh water to flow through conduits 74 and 75 to maintain pressure on the water jacketed seals for pumps 20 and 58.

Thereafter, fresh water is fed to tank 38 by opening valve 71. Since there is no liquid in this tank, float valve 72 is open to discharge water into the interior of this tank. When tank 38 is almost filled valves 42 and 45 are opened and recirculation pump 20 is turned on to pump water from tank 38 into cell body 21. When the level of liquid rises to outlet 23 it will flow out through conduit 36 back into tank 38.

Valve 84 is opened and acid pump 82 is now turned on to feed acid into tank 38 via conduit 83. The pH of the recirculating stream is lowered to at least pH 2.8, preferably 2.5.

The power supply will now be set to the calculated amperage by adjusting controller 31 and dc current flows between end electrodes 25 and 26, inducing current to flow between intermediate electrodes 24. The calculation of the amperage necessary to produce the required ferrous ion level in the ferrous ion generator, and the time required to build up to this level will be explained later herein.

Periodically the pH of the liquid in the ferrous ion generating tank 38 is measured by drawing a sample and checking with a portable pH meter. The acid feed rate is regulated by adjusting metering pump 82 to maintain the pH to about 2.5 or less. Once the recirculating stream reaches the proper ferrous ion level, the voltage reading indicated by voltmeter 33 on the power supply should be directly related to the pH in the electrolytic cell 18 and ferrous ion generating tank 19. If desired a plot of pH versus voltage may be made for various amp settings and kept handy to avoid having to measure pH each time the unit is readjusted for different influent contaminated stream conditions.

Valve 63 is now opened and the ferrous ion injection pump 58 is turned on. The bleed in stream introduced into pipe 10 via conduit 65 is adjusted to about 1% by volume of the flow rate of the contaminated stream flowing through pipe 10. This adjustment is made by opening valve 66 to the necessary extent to give the desired flow rate indicated by meter 64.

The influent contaminated stream, assumed to contain hexavalent chromium ions, is now allowed to flow into pipe 10 by opening suitable upstream valve means (not shown). After inline mixing of the contaminated and bleed in streams, and consequent reduction of hexavalent chromium ions to the trivalent state, the combined streams will still likely have a pH on the acidic side, say about pH 5.5. The pH sensor 91 will sense this and cause the analyzer-transmitter 92 to send an electrical signal to controller 93 which controls the speed of the drive motor for caustic feed pump 89. This results in the addition of caustic to pipe 10 via conduit 90 in order to control the pH, preferably to about 8.0, in the effluent discharged from pipe 10.

AMPERAGE CALCULATION

The ferrous ions ($Fe^{2+}$) employed as a reducing agent for the reducible metallic contaminant ion, such as hexavalent chromium ion ($Cr^{6+}$), are derived from dissolution of the iron electrodes in the electrolytic cell 18. The flow of a direct electric current through leads 28 and 29 causes the iron plates 24–26 to progressively dissolve, freeing ferrous ions ($Fe^{2+}$).

Iron can also be in the form of a ferric ion ($Fe^{3+}$). The freed ferrous ions ($Fe^{2+}$) ultimately convert to ferric ions ($Fe^{3+}$) by supplying electrons (e) to the hexavalent chromium ions ($Cr^{6+}$), which reduce $Cr^{6+}$ to trivalent chromium ions ($Cr^{3+}$). The trivalent chromium ions ($Cr^{3+}$) and the trivalent ferric ions ($Fe^{3+}$) severally combine with hydroxyl radicals ($OH^-$) derived from the water and caustic soda solution to form chromic hydroxide [$Cr(OH)_3$] and ferric hydroxide [$Fe(OH)_3$] which begin to precipitate if the pH rises above 2.8. These reactions may be represented as follows:

$$Fe = Fe^{2+} + 2e$$

$$Cr^{6+} + 3e = Cr^{3+}$$

$$Cr^{6+} + 3Fe^{2+} = Cr^{3+} + 3Fe^{3+}$$

$$Cr^{3+} + 3Fe^{3+} + 12OH^- = Cr(OH)_3 + 3Fe(OH)_3$$

It is a known physical fact that the electrochemical equivalent of divalent iron ($Fe^{2+}$) is about 3.5 Coulombs (ampere-second), i.e., it takes about 3.5 Coulombs to dissolve 1 milligram (mg) of iron as $Fe^{2+}$.

It is also a known physical fact that it takes about 3.2 times as much iron as chromium, in weight, to reduce one hexavalent chromium ion ($Cr^{6+}$) to one trivalent chromium ion ($Cr^{3+}$). Thus, knowing the amount of chromium to be reduced, one can compute the amount of iron required as about 3.2 times as much.

The above are theoretical values, and it is better to be more liberal in computing the current and iron to chrome ratio. Thus, a good working value is to figure that it takes 4 Coulombs to dissolve 1 mg $Fe^{2+}$, and 3.5 mg $Fe^{2+}$ to reduce 1 mg $Cr^{6+}$. The product ($4 \times 3.5 = 14$) means that 14 Coulombs should be provided to reduce each mg $Cr^{6+}$. Total amps can be calculated according to the following equation:

$$\text{total amps} = \frac{14\,(\text{amp} - \text{sec})}{\text{mg } Cr^{6+}} \times \frac{\text{mg } Cr^{6+}}{\text{min}} \times \frac{1 \text{ min}}{60 \text{ sec}}$$

By definition, 1 part per million (ppm) means 1 mg per liter. Assuming the basis of 1 gallon per minute (gpm) at 1 ppm $Cr^{6+}$ for the flow rate of the contaminated stream to be treated, this calculates to be 3.785 mg $Cr^{6+}$ per minute (min), as follows:

$$\frac{1 \text{ gal } H_2O}{\text{min}} \left| \frac{8.34 \text{ lbs } H_2O}{\text{gal } H_2O} \right| \frac{1 \text{ lb } Cr^{6+}}{10^6 \text{ lbs } H_2O} \left| \frac{454,000 \text{ mg}}{\text{lb}} \right. =$$

$$3.785 \frac{\text{mg } Cr^{6+}}{\text{min}}$$

Therefore, the total amps to treat 1 gpm at 1 ppm $Cr^{6+}$ is:

$$\text{total amps} = 14 \times 3.785 \times 1/60 = 0.8831 \text{ amps}$$

Now, for any flow rate and $Cr^{6+}$ concentration:

$$\text{total amps} = 0.8831 \times gpm \times ppm$$

The meter amps, indicated on ammeter 32, is equal to the total amps divided by the number of effective electrodes. In a bipolar arrangement of electrodes as shown, the number (no.) of effective electrodes is equal to the actual number of electrodes, less one. Thus, $$\text{meter amps} = \frac{.8831 \times gpm \times ppm}{\text{no. effective electrodes}}$$

For a 10% excess current allowance:

$$\text{meter amps} = \frac{.8831 \times gpm \times ppm}{\text{no. effective electrodes}} \times 1.1$$

$$= \frac{.97141 \times gpm \times ppm}{\text{no. effective electrodes}}$$

For example, if the contaminated stream to be treated contains 20 ppm $Cr^{6+}$ and is flowing at the rate of 100 gpm, and the electrolytic cell has 80 electrodes so that its effective number is 1 less or 79, substituting these values into the last mentioned equation results in the following:

$$\text{meter amps} = \frac{.97141 \times 100 \times 20}{79} = 24.59 \text{ amps}$$

Then controller 31 would be set for about 25 amps, as indicated on ammeter 32.

Based on the ferrous ion injection rate into the contaminated stream, it is necessary to recirculate the liquid body confined in cell 18 and receptacle 19 with the power on for a period of time in order to bring the ferrous ion concentration up to its proper level according to the following formula:

lag time, mins. = volume of recirculating stream loop, gals/injection rate, gpm

For example, if the volume of the stream recirculating between cell 18 and receptacle 19 is 160 gals and the injection rate intended is 1 gpm, the lag time in minutes to bring this loo up to the desired ferrous ion level will be:

lag time, mins. = 160 gals/1 gpm = 160 mins.

Thus, the current should be left on for 160 minutes before the recirculating stream is begun to be bled off at the rate of 1 gpm.

Should the $Cr^{6+}$ concentration in the contaminated stream admitted to main pipe 10, or the flow rate of such stream, increase, it will be necessary to recalculate the amp setting and adjust the controller 31, and hence the dc power supply to the cell, accordingly. It will take a certain lag time for the ferrous ion level to reach the required concentration to fully treat for this new set of conditions, according to the following formula:

new lag time = (new amp setting/old amp setting) $-1 \times$ (old lag time)

ELECTRODE REPLACEMENT

Periodically, based on the amperage to the electrodes 24-26, it will be necessary to replace these electrodes as they are consumed in operation of cell 18. An estimate of the electrode life in days may be calculated in the following manner.

As previously seen, 3.5 lbs. (#)$Fe^{2+}$ are required to reduce 1.0#$Cr^{6+}$.

If 80% electrode consumption is assumed, we have: 3.5/0.8 = 4.4#$Fe^{2+}$/1#$Cr^{6+}$ Considering the basis of 1 gpm of water containing 1 ppm $Cr^{6+}$, we have:

$$\frac{1 \text{ gal}}{\text{min}} \left| \frac{1440 \text{ min}}{\text{day}} \right| \frac{8.34\#}{\text{gal}} \left| \frac{1\#Cr^{6+}}{10^6 \#} \right. = .012\#Cr^{6+}/\text{day}$$

That is, 0.053#$Fe^{2+}$ per day are required to treat a water flow of 1 gpm containing 1 ppm $Cr^{6+}$.

$Fe^{2+}$/day (for any flow and concentration) = $0.053 \times gpm \times ppm$

The poundage (#) of effective iron in cell = (no. of electrodes $-1$) $\times$ weight per electrode Thus, $$\text{electrode life, days} = \frac{\text{\# of effective iron}}{\text{\# } Fe^{2+}/\text{day}}$$

$$= \frac{\text{\# of effective iron}}{.053 \times \text{gpm} \times \text{ppm}}$$

Electrode replacement procedure involves first stopping flow of the contaminated stream through main pipe 10. Then all pumps and the power to the cell are shut off. Valves 48 and 53 are opened, and valves 42 and 45 are closed. Recirculation pump 20 is then turned on for a brief interval to pump the contents of the cell 18 to the ferrous ion storage tank 49. The spent electrodes 24-26 are now replaced.

Valves 48, 53 and 71 are then closed, and valves 45 and 55 are opened. By turning on pump 20, the contents of tank 49 are now pumped back to cell 18 until the cell is filled, that is, up to when liquid begins to overflow through cell outlet 23. Since the replacement electrodes occupy more volume than the replaced electrodes, there will be some ferrous ion solution remaining in storage tank 49.

The ferrous ion injection pump 58 is now turned on, and the flow of contaminated liquid through pipe 10 is reestablished. Caustic pump 89 is now turned on.

The unit will operate for a brief period of time, utilizing residual ferrous ion solution in tank 38, before the need to transfer the remaining contents of storage tank 49 back to cell 18 and to turn on the fresh water to the ferrous ion generating tank 38 by opening valve 71. This will allow for consumption of excess ferrous ion solution due to cell volume loss after electrode change.

To accomplish this, recirculation pump 20 is now turned on briefly to transfer the ferrous ion solution remaining in storage tank 49 into cell 18 which, being already full, will cause overflow into tank 38 via conduit 36 and replenish the depleted reservoir of ferrous ion solution in tank 38.

When storage tank 49 is emptied, recirculation pump 20 is turned off. Valves 42 and 71 are now opened, and valve 55 is closed.

Thereafter, recirculation pump 20 is turned on, and so is acid pump 82. With the turning on of the ac power supply to control unit 30, the apparatus is now back on line in full operation.

During full operation, it will be seen that a body of ferrous ion solution is recirculating continuously, from which a stream is being bled off continuously for injection into the contaminated stream, while make up water and acid are being added continuously to the recirculating liquid body and the electrolytic cell is continuously producing ferrous ions for inclusion in the recirculating liquid body.

While in the above described preferred embodiment, fresh water was utilized for the medium to provide the ferrous ion solution, it is within the inventive concept, except as may be otherwise defined in the appended claims, to utilize a part of the contaminated stream itself to recirculate between the cell 18 and receptacle 19. Thus, a part of the influent to pipe 10 can be bypassed upstream to flow through the ferrous ion generator and then rejoined with the stream via conduit 65.

Other modifications may occur to those skilled in the art without departing from the spirit of the invention as defined in the appended claims.

What is claimed is:

1. Method of treating contaminant ions in a contaminated aqueous medium capable of benefitting from ferrous ions, comprising the steps of:
    (a) electrolytically generating ferrous ions in a separate aqueous medium having a pH of not more than 2.8, and
    (b) introducing said separate medium containing ferrous ions into said contaminated medium at a less than 1:1 volumetric ratio of separate medium to contaminated medium.

2. Method of providing ferrous ions for treating contaminant ions in a contaminated aqueous medium including hexavalent chromium ions reducible to a trivalent state, comprising the steps of:
    (a) electrolytically generating ferrous ions in a separate aqueous medium having a pH of not more than 2.8, and
    (b) introducing said separate medium into said contaminated medium at a less than 1:1 volumetric ratio of separate medium to contaminated medium and in a quantity to provide a weight ratio of ferrous ions at least 3.2 times that of the hexavalent chromium ions to be reduced.

3. Method of providing ferrous ions for treating contaminant ions in a contaminated aqueous medium capable of benefitting from ferrous ions, comprising the steps of:
    (a) electrolytically generating ferrous ions in a separate liquid body of an aqueous medium to raise its ferrous ion content to a predetermined level,
    (b) bleeding off a portion of said separate body after its ferrous ion content has been raised to said level and introducing it into said contaminated medium at a less than 1:1 volumetric ratio of said portion bled off to said contaminated medium, and
    (c) introducing additional aqueous medium into said separate body to make up volumetrically for said portion bled off.

4. Method of providing ferrous ions for treating contaminant ions in a contaminated stream of an aqueous medium capable of benefitting from ferrous ions, comprising the steps of:
    (a) recirculating a separate confined liquid body of an aqueous medium through an electrolytic cell having iron electrodes to generate ferrous ions for a length of time to raise the ferrous ion content of said separate body to a predetermined level, and
    (b) thereafter bleeding off a portion of said separate body and introducing it into said stream at a flow rate less than that of said stream, while introducing additional aqueous medium into said separate body to make up volumetrically foe said portion bled off.

5. Mthod of electrolytically generating ferrous ions for treating any contaminated water capable of benefiting from ferrous ions, comprising the steps of:
    (a) providing a confined liquid body of an aqueous medium separate from said contaminated water and having a predetermined upper pH limit,
    (b) continuously recirculating such separate body through an electrolytic cell having iron electrodes to generate ferrous ions in said separate body,
    (c) after the ferrous ion content of said separate body has been raised to a predetermined level, continuously bleeding off a portion of said separate body
    (d) continuously adding aqueous medium to such recirculating liquid body to make up volumetrically for said portion bled off while maintaining the pH of said recirculating body at not more than said limit, and (e) introducing said portion bled off into said contaminated water at a less than 1:1 volumetric ratio of said potion bled off to said contaminated water.

6. Method as set forth in claim 3, wherein the pH of said separate body is not more than 2.8.

7. Method as set forth in claim 3 or 6, wherein said contaminant ions include hexavalent chromium ions reducible to a trivalent state, and said portion of said separate body containing ferrous ions is introduced into said contaminated medium in a quantity to provide a weight ratio of ferrous ions at least 3.2 times that of the hexavalent chromium ions to be reduced.

8. Method as set forth in claim 4, wherein the pH of said separate body is not more than 2.8.

9. Method as set forth in claim 4 or 8, wherein said contaminant ions include hexavalent chromium ions reducible to a trivalent state, and said portion of said separate body containing ferrous ions is introduced into said stream in a quantity to provide a weight ratio of ferrous ions at least 3.2 times that of the hexavalent chromium ions to be reduced.

10. Method as set forth in claim 5, wherein said upper pH is 2.8.

11. Method as set forth in claim 5 or 10, wherein said contaminated water includes hexavalent chromium ions reducible to a trivalent state, and said portion of said separate body containing ferrous ions is introduced into said contaminated water in a qantity to provide a weight ratio of ferrous ions at least 3.2 times that of the hexavlent chromium ions to be reduced.

* * * * *